United States Patent [19]

Tylenda

[11] Patent Number: 4,751,253
[45] Date of Patent: Jun. 14, 1988

[54] METHOD OF PREPARING DIMENSIONALLY STABLE, FLEXIBLE URETHANE FOAM AND THE FOAM PRODUCED THEREBY

[76] Inventor: Eugene J. Tylenda, 14 Sagamore Rd., Parsippany, N.J. 07054

[21] Appl. No.: 915,623

[22] Filed: Oct. 6, 1986

[51] Int. Cl.$^4$ .............................................. C08G 18/30
[52] U.S. Cl. ................................... 521/114; 521/116; 521/117; 521/122; 521/130; 521/157; 521/172; 521/904
[58] Field of Search ............... 521/114, 116, 117, 130, 521/157, 172, 904, 122

[56] References Cited

U.S. PATENT DOCUMENTS 3,579,471  5/1971  Dijkhuizen et al. ................ 521/116

*Primary Examiner*—John Kight
*Assistant Examiner*—S. A. Acquah
*Attorney, Agent, or Firm*—Richard P. Crowley

[57] ABSTRACT

An open celled, dimensionally stable, flexible urethane foam and method of preparing such foam, which method comprises adding a cell opening dimensionally stabilizing amount of an additive to a foamable urethane composition, and thereafter foaming the composition containing such additive to provide a dimensionally stable, flexible urethane foam product. The additive mixture employed comprises an ester reaction product of a long chain acid with polyethylene or polypropylene glycols and/or contains free acid to provide for a desired acid value. The dimensionally stable, flexible foam product produced is particularly useful in the automotive industry as a flexible molded-type foam for use as cushions and seats.

20 Claims, No Drawings

METHOD OF PREPARING DIMENSIONALLY STABLE, FLEXIBLE URETHANE FOAM AND THE FOAM PRODUCED THEREBY

BACKGROUND OF THE INVENTION

Flexible foams, such as for example, flexible urethane foams, are employed for a variety of purposes and may, for example, be molded into cushions, seats and other uses, particularly for the automotive and other industries. The flexible urethane foams for use in the automotive industry are typically prepared by a standard reaction of a polyol(s) with an isocyanate(s) in the presence of a catalyst or catalysts and also a blowing agent(s), such as water, with or without a halocarbon, to provide a foam reaction mixture which results in a mixture of both open and closed cells. In one application in the automotive industry flexible urethane foams are cold cured flexible foams to form high resilience molded polyurethane foam parts. In the auto and other industries the foam formulations employed are such that it is necessary to crush or open up the resulting molded foam prepared immediately or shortly after preparation because the foam product prepared tends to shrink and lose dimensional stability.

For example, in the automotive industry, the flexible cold cured urethane foams are prepared and introduced into a mold to form various foam products. The resulting molded foam product must be treated by cell opening techniques in order to provide a suitable product of desired dimensional stability. Normally within 15 to 90 seconds after demolding the foam product is passed through a pair(s) of nip rollers to crush the foam, or the foam is put in a vacuum to cause a similar action, or air injection may be introduced into the foam product, all with the purpose of providing a cell opening effect. A discussion of the problems of molded foam and one suggested cell opening technique is described in a Union Carbide Corporation bulletin "Novel Cell Opening Technology for HR Molded Foam," K. D. Cavender, 1985, incorporated by reference herein.

If such cell opening techniques are not employed with such foams, then the foams after demolding start to shrink and become wrinkled. The lack of dimensional stability of the resulting foam product is generally accepted as arising from an excessive amount of closed cells in the foam product with gases trapped in closed cells, which gases are hot during the expansion cycle, and which after demolding and cooling of the foam product contract, resulting in a loss of dimensional stability to the foam product. The process and mechanical techniques now employed in the industry to impart dimensional stability are designed to crush and thereby open the cells in order to impart dimensional stability to the foam product.

It is therefore desirable to provide a new technique and means to impart dimensional stability to flexible foam products whereas to either eliminate the present technique to crush or open up the foam product or to provide a foam product with a low or minimal need for the employment of other techniques for the crushing or opening up of the foam product.

SUMMARY OF THE INVENTION

The present invention concerns a method of preparing a dimensionally stable foam product, the dimensionally stable product produced by the method, and the compositions employed to open up and stabilize dimensionally the foam product. Particularly, the invention concerns chemical formulations and techniques to provide a dimensionally stable, flexible urethane and other foam products which eliminates or reduces the need for crushing of the foam products after preparation in order to open up and impart dimensional stability to the product.

The present invention concerns a chemical additive, rather than a purely mechanical or processing technique, to open up the foam products; that is, to increase the amount of open cells in the products and to impart dimensional stability to the foam product, thereby reducing the tendency of the resulting foam product to shrink or otherwise change dimensions. The invention concerns the employment of a cell opening additive to a foamable polymer composition, which cell opening additive either eliminates the need to crush in order to open the foam product after preparation or substantially reduces the amount of other treatment required to provide an acceptable foam product.

The invention is particularly adaptable for use with flexible, high resilient urethane foam products which are molded or otherwise formed into cushioned seats and for other uses and parts in the automotive, packaging and other industries. For example, in the automotive field the molded foam product may have thin and thick sections in the same part ranging from $\frac{1}{2}$ to 4 inches or more. The method of the invention concerns the preparation of a foam product with an increase in open cells, which method comprises: foaming a foamable composition to provide a foam product, which foamable composition contains therein a cell opening amount of an additive or additive composition in an amount and ratio sufficient to provide for the desired foam dimensional stability. The invention also relates to the open cell dimensionally stable foam product produced by the method and to the additive cell opening compositions employed in preparing such products.

The cell opening additive employed in foamable polymers, particularly urethane compositions, comprises: (a) a long chain hydrocarbon free acid; (b) a polyol long chain acid ester product; or (c) a combination of the free acid and the ester product.

It has been discovered quite surprisingly and unexpectedly that the addition of a long chain hydrocarbon carboxylic acid to a foamable urethane composition within a defined narrow range of concentration provides cell opening and a dimensionally stable foam product. The free acid is generally added to the polyol side of the urethane composition and should be compatible with and soluble in the polyol composition employed. Generally, the free acid comprises an alkanoic acid or alkenoic acid, such as a $C_{14}-C_{22}$ saturated or unsaturated fatty acid, or mixtures thereof, and particularly a $C_{18}$ fatty acid, such as, but not limited to: oleic acid; stearic acid; stearolic acid; linolenic acid; linoleic acid; and combinations thereof.

The amount of free acid may vary depending upon the specific foamable composition used. However, it has been found that the free acid is an effective cell opening additive within a defined narrow range of concentration. The range of concentration for each particularly foamable composition can be easily determined by testing the foamable composition with a varying concentration of the free acid and testing the resulting foam product for the variation in open cells, such as by the use of established air flow testing techniques and apparatus, e.g. Dow Chemical Air Flow Apparatus Model DA, for use with foam (see, for example, ASTM-D 1564 Air Flow Test).

For example, and for the purposes of illustration only, it has been discovered that the use of free acid both below and above a particular concentration range will produce unacceptable results, while free acid in the defined range is an effective cell opening additive. For example, oleic acid in an amount of about 0.15 to 0.23 parts by weight per 100 parts of the total polyol in a urethane composition produces a foamable, open cell, dimensionally stable urethane foam.

The polyol-acid ester product is typically a glycol-long chain acid ester product, and more particularly a polyethylene or polypropylene glycol product which has been reacted, fully or partially, with the free acid, for example, a fatty acid like oleic or linoleic acid, or mixtures, to provide for a polyethylene glycol or polypropylene glycol oleate or linoleate product. The ester additive may be prepared by reacting the polyol-acid mixture to a given acid value, or by over cooking to an even lower acid value than desired, and then simply adding additional free acid of the same or different acid to obtain the original acid value or selected acid value. The acid values may vary as desired of the additive mixture. Specifically, successively preparations have resulted from acid values of about 4.4 to 198, i.e. pure fatty acid, typically from 7.5 to 45.

The polyol-acid ester products useful in the invention particularly comprise the polyethylene and polypropylene glycol-fatty acid mono- and diester products. Typically, the ester products may be prepared by reacting the polyol, e.g. polyalkylene glycol, with the free acid in the presence of a catalyst and heating the reaction mixture and recovering the ester product which may comprise a mixture of mono- and diester products and free acid.

It has been found that the diester products are particularly useful as cell opening additives either alone or in combination with the free acid and over a much wider concentration range than the free acid cell opening additives. The ester product is added to the polyol composition of the foamable urethane composition and must be compatible and generally soluble in the polyol composition.

The cell opener ester additives are available as commercial products and are known as PEG 200, 300, 400, 600, and 1000. Typical ester products comprise, but are not limited to: the 200, 300, 400, and 600 polyethylene glycol dioleates; monooleates; di- or monostearates; di- or monostearolates; di- or monolinolenates; di- or monolinoleates; and combinations thereof.

One preferred product comprises the 600 or 400 polyethylene glycol dioleate, particularly in combination with or containing free oleic acid. The polyol-acid ester product is employed in an amount to provide the amount and type of cell opening and dimensional stability desired, and typically is used in an amount of up to about 5 parts per 100 parts of the polyol in the foamable urethane composition, and more typically in an amount of about 0.05 to 3 parts, e.g. 0.1 to 2 parts.

The cell opening additive may also preferably comprise a combination of the free acid and the ester product either by the admixture of the products or with the free acid being a part of the reacting mixture used in preparing the polyol-acid ester product. A particularly preferred combination would be polyethylene glycol oleate with free oleic acid.

A glycol fatty acid ester and a variety of selected acid values, that is different levels of free oleic acid concentration therein, may be employed as a cell opening additive in a variety of cold cured foams in which cell opening and dimensional stability is desired to be imparted at least in part by chemical techniques through use of the additive. Polyethylene glycol oleate compositions with free oleic acid have been found to be successful additives. It is desirable that the additive composition be a liquid composition at ambient temperatures. And therefore, the use of high molecular weight esters and/or the use of free acids which will produce a solid or viscous esterification product are not wholly desirable, although such products may be employed, but typically should be dispersed in an inert liquid carrier for easy addition and incorporation into the foamable foam compositions.

The cell opening additive of the invention may be used with a variety of polymeric foams to open the foam and to impart dimensional stability to the foam. The foam employed may be a polyether or polyester foam employed in the preparation of a molded product or may be a slab stock foam of a free rise formulation, for example, a cold cured HR foam formulation. The urethane foam is prepared by the reaction of a polyol with an isocyanate, the isocyanate may comprise TDI, MDI or blends thereof. In urethane-type foams a foamable mixture may also include other additives, for example blowing agents, such as halocarbons; silicone additives to promote foam cell formation; metalo organic catalysts, such as urethane-type catalysts, such as tin and particularly alkyl fatty acid tins; as well as blowing-type catalysts, such as amines, like tertiary amines, triethylene diamines, formate salts, and other amine-type catalysts, such as di- and triethylene diamine; as well as other additives typically employed in such urethane formulations including a variety of polyols, stabilizers, and flame retardant agents.

The cell opening additive compositions are particularly useful with flexible urethane foam products wherein the foam is prepared by pouring the reaction ingredients into an open mold which is then closed and opened just prior to demolding. The cell opening composition is employed simply by adding the composition into the foamable composition prior to foaming. Generally, the cell opening additive or mixture is mixed or incorporated into the polyol composition or part of the urethane composition. The resulting foam product has improved dimensional stability and a greater amount of open cells than a product without the additive. While the cell opening composition improves dimensional stability, it may also still be desirable to mechanically or otherwise treat the foam product to obtain the desired degree of dimensional stability. However, the use of the additive product considerably reduces the need for and often eliminates the need for other techniques to provide dimensional stability.

The invention will be described for the purposes of illustration only in connection with certain embodiments; however, it is recognized that those persons skilled in the art may make various changes, additions and improvements to these embodiments all without departing from the spirit and scope of the invention.

DESCRIPTION OF THE EMBODIMENTS

Example 1

A flexible urethane foam product having the following formulation was prepared:

|  | Parts by Weight |
|---|---|
| 1. TDI (100 Index) | 42.7 |
| 2. Polyol (BASF 945, MW = 4700, OH = 35) | 50 |
| 3. Polyol (BASF 973, Polymer Polyol MW = 4700, OH = 24.5) | 50 |
| 4. Stabilizing agent - Diethanol amine | 1.7 |
| 5. Blowing agent - water | 3.5 |
| 6. Cell promoter - Dow-Corning Silicone 5043 | 1.3 |
| 7. Gelating and blowing catalyst - 33% triethylene diamine in dipropylene glycol | 0.25 |
| 8. Delayed blowing catalyst - formate salt (A-107 Union Carbide Corporation) | 0.3 |
| 9. Delayed catalyst (8154 Air Products Co.) | 0.18 |
| 10. Cell opening additive TYBAR (trademark of applicant) polyethylene glycol dioleate (PEG 400) mixture with free oleic acid (AV = 24.4) | 1.5 |

The above flexible urethane formulation was mixed and poured into an open mold to form an automotive flexible foam seat cushion. Where the cell opening additive was not employed in the above formulation, the resulting uncrushed foam product after demolding in approximately 8 to 10 minutes wrinkled and shrank.

The HR molded urethane foam product may be post treated to open the cells; however, after about 10 minutes, mechanically treating the foam product is not possible without rupturing the foam product. However, where the additive is employed, the foam product may be mechanically or otherwise treated without rupturing the foam product. Therefore, if improper levels and/or ratios of the additive are employed and the foam shrinks, the additive permits prior art treatment of the foam product to open the cell and provide dimensional stability. Also, it has been found that the resulting urethane foam product with the cell opening additive exhibits an improved, i.e. lower, humid age compression set.

However, when employing the cell opening additive as above the resulting foam product produced was open celled, did not wrinkle, and had good dimensional stability.

Example 2

A variety of trials have been carried out employing the cell opening additives of the invention in various flexible molded urethane foam compositions with a substantial improvement in dimensional stability through the use of the cell opening additives.

| Urethane Formulation | Range in parts by weight |
|---|---|
| 1. TDI (90 to 103 Index) | 38.40–48.80 |
| 2. Polyol (BASF 945) | 50–70 |
| 3. Polyol polymer (BASF 973) | 50–30 |
| 4. Diethanol amine (DEOA) (e.g. 0.5 to 2.5) | 1.0–1.7 |
| 5. Cell promoter - stabilizer - silicone (DC 5043) | 1.0–1.3 |
| 6. Catalyst - organo metallic e.g. dibutyl tin dilaurate | 0–0.007 |
| 7. Cell opening additive (AV = 4.4 to 45.0) 0.5–2.0 | |
| 8. Blowing agent - water (e.g. 1.5 to 4.7) | 3.5–4.1 |
| 9. Blowing agent - Freon (e.g. 0 to 8.0) | 0–3.0 |
| 10. Catalyst (A-107) | 0.3 |
| 11. Catalyst - triethylene diamine (33% in dipropylene glycol) | 0.25 |
| 12. Catalyst (8154) | 0.18–0.25 |

The foam products prepared from the formulations of Example 2 exhibit improvements in dimensional stability through the use of the cell opening additive as established by the ASTM Air Flow Test which measures the degree of open cells with and without the use of the additive.

Example 3

A flexible molded urethane foam was prepared as in Example 1 with and without the use of the TYBAR cell opening additive. A foam product without the cell opening additive was crushed after removal from the mold as in the prior art by passing the foam through a pair(s) of nip rollers. Samples of both uncrushed and crushed foams and foams with varying amounts and types of cell opening additives were then tested. Dimensional stability was tested by measuring the dimensions of the sample and multiplying the length by the width by the thickness of the sample to obtain a test result. A high figure indicates greater dimensional stability.

The degree of open cells as related to air flow, also a measure of dimensional stability, was tested by ASTM-D 1564 employing a Dow Air Flow Apparatus Model DA with the test results reported as air flow in cubic feet per minute (CFM) with air flow tested parallel to foam rise. A high CFM figure indicates a greater degree of open cells and greater dimensional stability. The test results are shown in the table attached hereto.

TABLE

| PRODUCT | ADDITIVE - PARTS BY WEIGHT | | DIMENSIONAL STABILITY $MM^3 \times 10^7$ | AIR FLOW CFM |
|---|---|---|---|---|
| | PEG Dioleate | Oleic Acid | | |
| 1. Foam - crushed | 0 | 0 | 5.556 | — |
| Foam - uncrushed | 0 | 0 | 5.459 | — |
| Foam - uncrushed w/additive | .388 | .113 | 5.226 | 0.60 |
| 2. Foam - crushed | 0 | 0 | 5.659 | 1.0 |
| Foam - uncrushed | 0 | 0 | 5.498 | 0.61 |
| Foam - uncrushed w/additive | .627 | .182 | 5.843 | 1.3 |
| 3. Foam - crushed | 0 | 0 | 5.603 | 0.96 |
| Foam - uncrushed | 0 | 0 | 5.378 | 0.72 |
| Foam - uncrushed w/additive | .852 | .248 | 5.805 | 1.8 |
| 4. Foam - crushed | 0 | 0 | 5.611 | — |
| Foam - uncrushed | 0 | 0 | 5.408 | — |
| Foam - uncrushed w/additive | 1.08 | .32 | 5.831 | 1.6 |
| 5. Foam - crushed | 0 | 0 | 5.565 | 0.86 |
| Foam - uncrushed | 0 | 0 | 5.451 | 0.67 |

TABLE-continued

| PRODUCT | ADDITIVE - PARTS BY WEIGHT | | DIMENSIONAL STABILITY $MM^3 \times 10^7$ | AIR FLOW CFM |
|---|---|---|---|---|
| | PEG Dioleate | Oleic Acid | | |
| Foam - uncrushed w/additive | 0 | .113 | 4.323 | 0.30 |
| Foam - uncrushed w/additive | 0 | .248 | 5.193 | 0.51 |
| Foam - uncrushed w/additive | 0 | .182 | 5.700 | 1.1 |
| 6. Foam - crushed | 0 | 0 | 5.622 | — |
| Foam - uncrushed | 0 | 0 | 5.437 | — |
| Foam - uncrushed w/additive | 1.32 | .18 | 5.830 | 1.7 |

The above test results indicate the significant increase in dimensional stability and degree of open cells by the use of oleic acid alone and the use of oleic acid in combination with a PEG oleate.

For the purposes of this application and the tests conducted, the oleic acid employed as the additive or used to prepare the dioleate ester compound comprises commercial oleic acids which contain a high concentration of oleic or linoleic acids, generally more than a total of 70 percent by weight, and also contains a mixture of other saturated and unsaturated $C_{14}$-$C_{22}$, e.g. $C_{14}$-$C_{18}$ fatty acids.

Where the oleic acid is derived from tall oil, the mixture would contain also minor amounts of rosin acids. The oleic acid used to prepare the dioleate ester had a composition of: 47 percent oleic acid; 46.5 percent linoleic acid; 5 percent stearic acid; 0.5 percent palmitoleic acid; and 1 percent palmitic acid.

The oleic acid used as an additive alone had a composition of: 73 percent oleic acid; 8 percent linoleic acid; 1 percent linolenic acid; 7 percent palmitoleic acid; 4 percent palmitic acid; 3 percent myristic acid; and 3 percent myristoleic acid.

What is claimed is:

1. A method of preparing a molded, high resilience, urethane foam product of improved dimensional stability, which method comprises:
   (a) adding to a foamable urethane composition a cell opening amount of a cell opening additive, which additive is selected from the group consisting of:
      (i) a long chain fatty acid;
      (ii) a polyethylene or polypropylene glycol-long chain fatty acid ester; and
      (iii) a mixture of "(i)" and "(ii)";
   (b) reacting the foamable urethane composition in a closed mold to provide a high resiliency, molded urethane foam product; and
   (c) recovering a molded foam product of improved dimensional stability and having a greater amount of open cells than the molded foam product produced without the cell opening additive.

2. The method of claim 1 which includes preparing a high resilient, molded urethane product by:
   (a) pouring the foamable urethane composition into an open mold;
   (b) closing the mold and reacting the foamable urethane composition in the closed mold;
   (c) opening the mold after preparation of the foam product; and
   (d) removing the foam product from the mold.

3. The method of claim 1 wherein the said ester is present in an amount of from about 0.1 to 5 parts per 100 parts of polyol in the urethane composition.

4. The method of claim 1 wherein the fatty acid is present in an amount of from about 0.15 to 0.23 parts per 100 parts of polyol in the urethane composition.

5. The method of claim 1 wherein the fatty acid is a $C_{14}$-$C_{22}$ fatty acid.

6. The method of claim 1 wherein the fatty acid is selected from the group consisting of:
   (a) oleic acid;
   (b) stearic acid;
   (c) stearolic acid;
   (d) linolenic acid;
   (e) linoleic acid;
   (f) palmitic acid;
   (g) palmitoleic acid;
   (h) myristic acid;
   (i) myristoleic acid; and
   (j) mixtures thereof.

7. The method of claim 1 wherein the ester comprises a reaction product of a polyethylene glycol and a $C_{14}$-$C_{22}$ fatty acid.

8. The method of claim 7 wherein the reaction product has an acid value of about 4.4 to 45.

9. The method of claim 1 wherein the ester comprises a polyethylene glycol-mono- or di-$C_{18}$ fatty acid, and mixtures thereof.

10. The method of claim 1 wherein the additive comprises a polyethylene glycol dioleate or linoleate.

11. The method of claim 1 wherein the mixture comprises a $C_{18}$ fatty acid and a polyethylene glycol $C_{18}$ fatty acid ester.

12. The method of claim 1 wherein the fatty acid comprises linoleic acid or oleic acid in an amount of 0.15 to 0.23 parts per 100 parts of the polyol of the urethane composition.

13. The method of claim 1 which includes mechanically treating the close molded foam product to increase the number of open cells.

14. The method of claim 13 which includes crushing the close molded foam product to increase the number of open cells.

15. The close molded foam product produced by the method of claim 1.

16. A method of preparing a molded, high resiliency, urethane foam product of improved dimensional stability, which method comprises:
   (a) adding to a foamable urethane composition a cell opening amount of a cell opening additive, which additive is selected from the group consisting of:
      (i) a $C_{18}$ fatty acid;
      (ii) a polyethylene glycol-$C_{18}$ fatty acid ester; and
      (iii) a mixture of "(i)" and "(ii)";
   (b) introducing the composition containing the additive into an open mold;
   (c) closing the mold to permit the preparation of the foam product;
   (d) opening the mold; and
   (e) recovering a high resiliency molded foam product of improved dimensional stability and having a greater amount of open cells than the molded foam product produced without the cell opening additive.

17. The method of claim 16 wherein the $C_{18}$ fatty acid is present in an amount of 0.15 to 0.23 per 100 parts of the polyol of the urethane composition.

18. The molded foam product produced by the method of claim 16.

19. The method of claim 1 wherein the foamable urethane composition contains a silicone cell promoter additive.

20. The molded foam provided by the method of claim 13.

* * * * *